March 10, 1959

D. PARRETT 2,876,881

AUTOMATIC SELF-ADJUSTING CLUTCH

Filed April 15, 1957

INVENTOR
DENT PARRETT
BY
Cobb & Cobb
ATTORNEYS

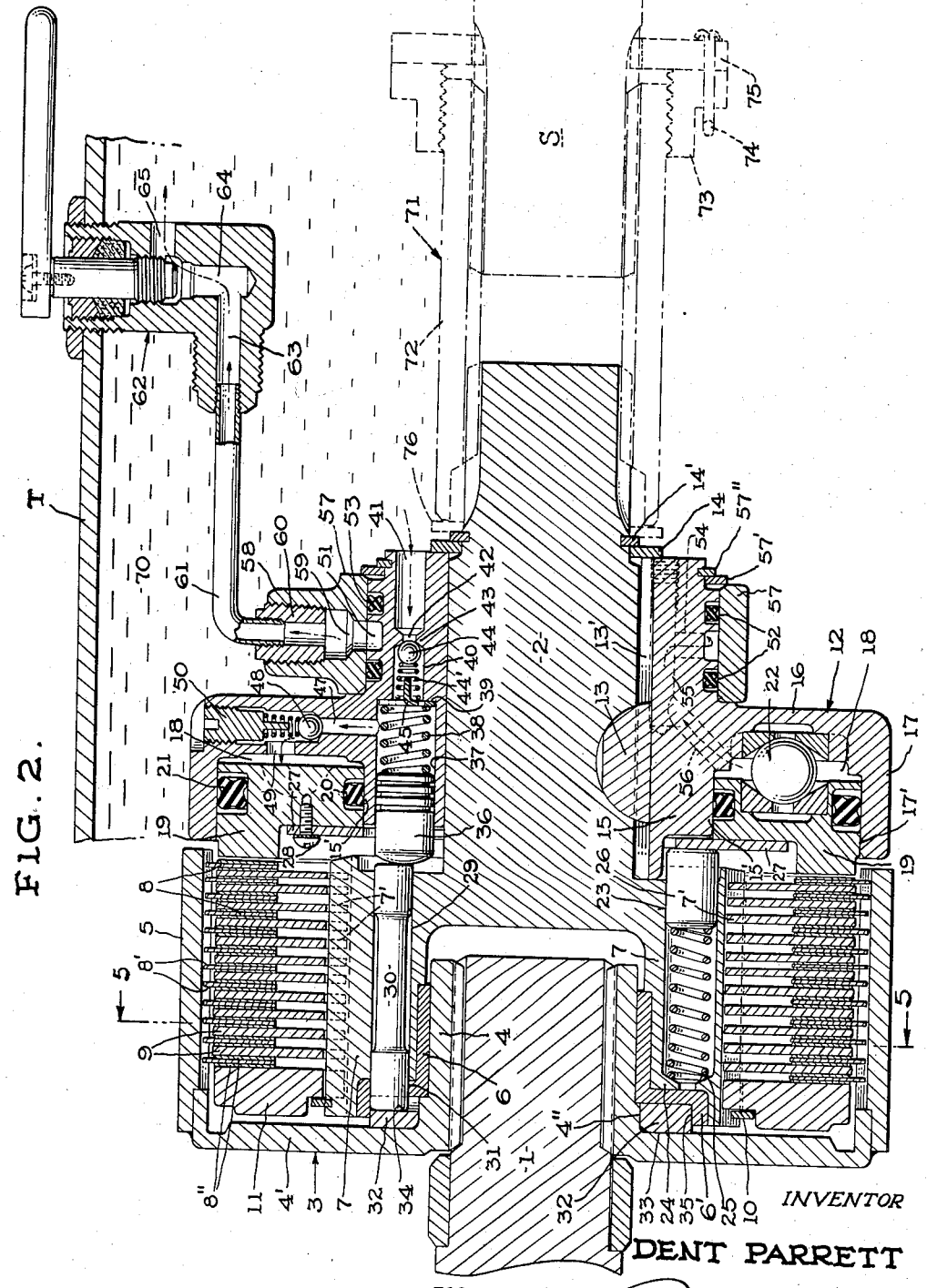

March 10, 1959

D. PARRETT 2,876,881

AUTOMATIC SELF-ADJUSTING CLUTCH

Filed April 15, 1957

INVENTOR

DENT PARRETT

BY

ATTORNEYS

March 10, 1959
D. PARRETT
2,876,881
AUTOMATIC SELF-ADJUSTING CLUTCH
Filed April 15, 1957
4 Sheets-Sheet 4
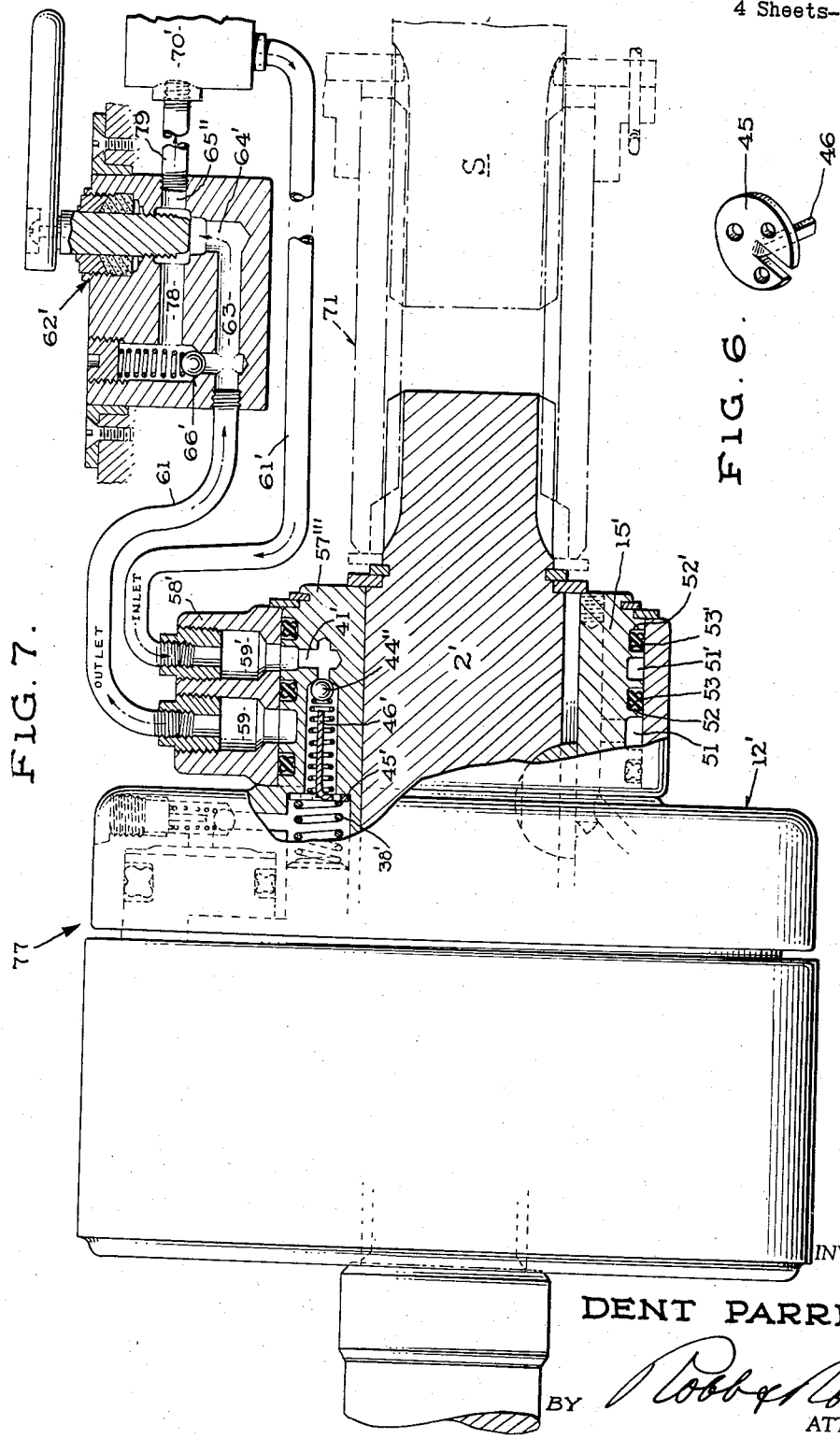
INVENTOR
DENT PARRETT
BY
ATTORNEYS United States Patent Office 2,876,881
Patented Mar. 10, 1959

2,876,881

AUTOMATIC SELF-ADJUSTING CLUTCH

Dent Parrett, St. Joseph, Mich., assignor, by mesne assignments, to Lambert Brake Corporation, St. Joseph, Mich., a corporation of Michigan Application April 15, 1957, Serial No. 652,954

17 Claims. (Cl. 192—85)

The present invention relates to friction devices, and more particularly to an improved clutch or other friction device of a type which has many varied uses, but more particularly is readily adaptable for installation in a conventional change-speed gear transmission of a farm tractor without necessitating any substantial modification of the transmission assembly or of the conventional housing thereof.

In addition to usefulness as a power take-off clutch for tractors and other vehicle usage, the clutch of this invention, which will be seen to be adapted equally well to either wet or dry clutch usage, is exceedingly well suited for use in any installation where space limitations require a small but powerful clutch or friction device, such as in machine tool drives, marine reduction gear drives, automatic transmissions for motor vehicles, truck transmissions and elsewhere.

Heretofore, clutches have been provided which are extremely powerful for their relatively small size, for installations such as in the transmission of farm tractors to provide an auxiliary clutch to control the drive for a power take-off shaft of said tractors, thereby rendering auxiliary farm equipment continuously operable, while allowing interruption of the drive to the traction wheels of the tractor. Many of these clutches, however, are associated with control mechanisms which occupy considerable space and add substantially to the over-all size of the clutch.

Accordingly, a primary objective of this invention is to provide a friction device or clutch of relatively small size but of extremely high torque capacity, and which includes a control mechanism that is so compactly constructed and so combined with the clutch proper as to require only a very slight amount of space in addition to the clutch itself.

The major objective of this invention, however, is to provide a clutch of the class aforesaid which is automatically operable responsive to valve or push-button control.

Another major objective of this invention is the provision of a clutch that automatically maintains its own hydraulic actuating pressure and thereby automatically assuring compensation for variations in load.

Both of the foregoing major objectives are accomplished by a novel construction embodying a self-contained pumping action that automatically supplies the operating force which the operator heretofore has been required to exert.

Another important objective of the invention is to provide an anti-slippage feature, the same being accomplished by a self-contained pumping action which automatically increases the pressure on the friction elements as increased torque loading occurs.

The invention still further contemplates the provision of pressure-release means for limiting torque loads, and the elimination of separate wear take-up means through utilization of hydraulic operating fluid pressure automatically urging the friction members into contiguous engagement when in operation.

Other objects and advantages of the invention will become apparent from the following detailed description, taken in connection with the accompanying drawings, and the novel features thereof will be defined in the appended claims.

In the drawings:

Fig. 2 is a longitudinal cross-sectional view as taken substantially on the line 2—2 of Fig. 1, with the control valve shown operatively connected to the clutch, and both the valve and clutch being illustrated as an immersed or wet clutch adaptation;

Fig. 6 is a perspective detail of a perforated and tongued limit washer which acts as a stop for the ball inlet valve; and Fig. 7 is a view, partly in cross-section and partly in side elevation, of a modified form of the clutch arrangement as more particularly adapted for use as a dry clutch.

Figure 1:
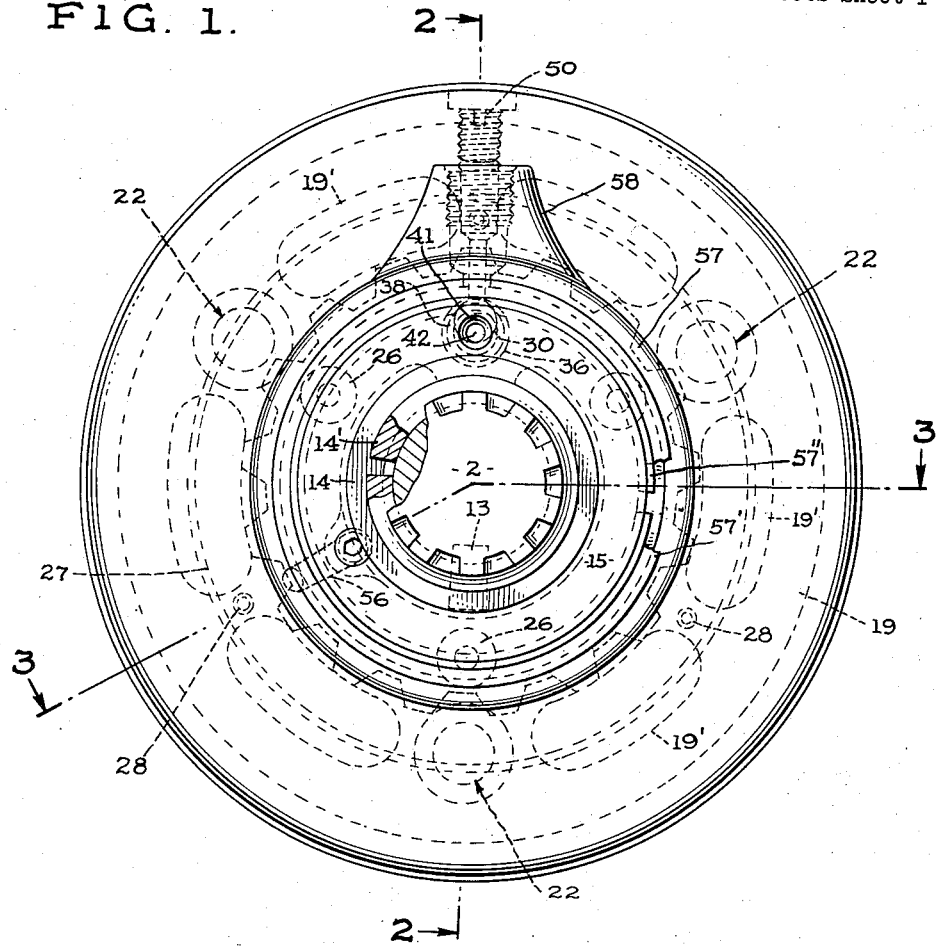
Fig. 1 is an end elevational view of a clutch constructed in accordance with the invention and as more particularly intended for use as a wet clutch, the associated control valve and conduit thereto being omitted for clarity.

Like reference characters in the several views of the drawings designate corresponding parts. Referring more particularly to Fig. 2 of the drawings, 1 and 2 respectively designate a pair of rotary members such as a power input and a power output shaft, it being immaterial, however, in which direction the power is transmitted from one shaft to the other.

Figure 5:
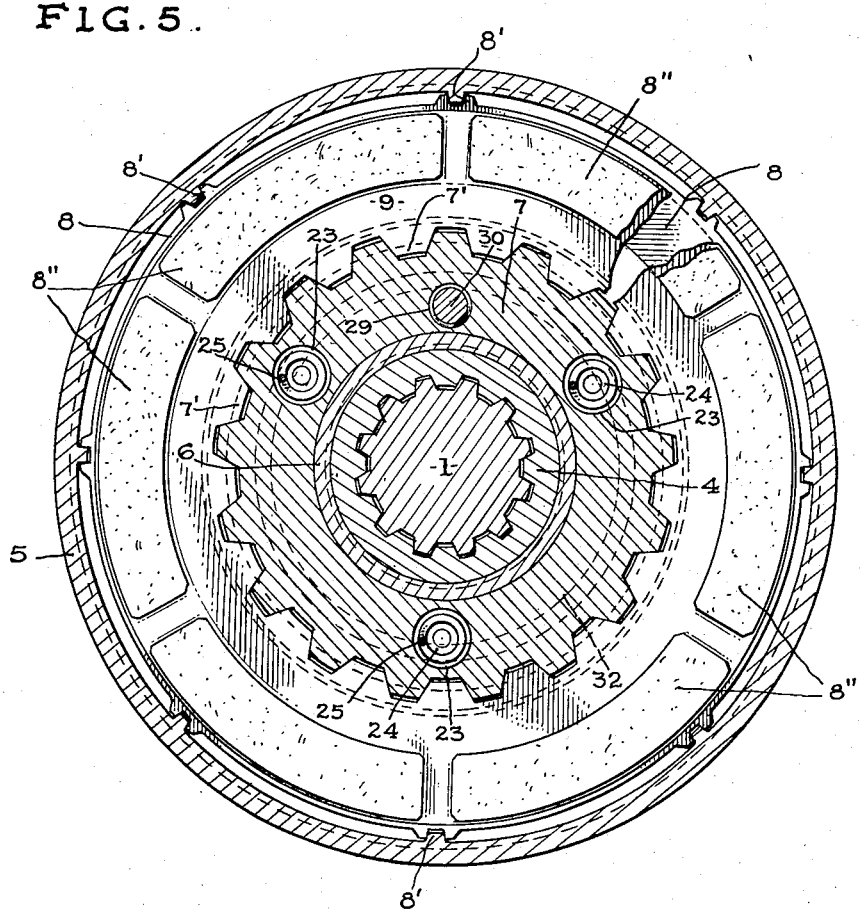
Fig. 5 is a vertical cross-sectional view as taken on line 5—5 of Fig. 2, clarifying the relationship of the reciprocating pump push-rod, return springs and other component parts of the clutch.

Adapted to be mounted on the splined end of shaft 1 for rotation therewith is a housing and power plate assembly 3, comprising a hollow complementally splined hub 4, and a combined housing or power plate 4', said power plate 4' having suitably secured to its marginal periphery, as by welding or otherwise, a cylindrical housing shell 5. Journalled on the hub 4, by means of a flanged generally bell-shaped bearing 6, is an enlarged terminal hub extension 7 on the output shaft 2. The opposed inner and outer annular faces of housing shell 5 and the hub extension 7, respectively, are preferably each suitably splined to mate with complemental splines on a pack of inter-leaved friction discs 8 and 9, the middle discs 8 being splined preferably at their outer periphery to housing shell 5, as at 8', and the other discs 9 being splined preferably on their inner periphery to the hub 7, as at 7', both sets of discs 8 and 9 being thereby adapted for rotation with and for axial sliding movements relative to said shell 5 and hub 7, respectively. The opposite faces of discs 8 are preferably provided with bonded lining segments as 8" (best seen in Fig. 5). Also carried on said splined hub 7, and held thereon by snap ring 10, is a splined back-up or pressure plate 11 which is adapted for rotation with and axially slidable on output shaft 2, said back-up plate 11 being disposed adjacent to the friction disc pack and in spaced relation to the power plate 4' which constitutes the end wall of the housing.

In the illustrated clutch, an axially fixed secondary disc member 12 is keyed on to the output shaft 2 by at least one key 13. A washer 14 and a snap ring 14' are preferably used to hold said secondary disc member 12 against axial movement on the output shaft 2 after assembly thereof.

Secondary disc member 12 includes an elongated hub section 15 and a radially extended plate or disc portion 16 intermediate the extreme ends of said hub section 15, said latter disc portion having its outer periphery terminating in the form of an axially extended housing shell 17 that is concentric with the hub section 15 and generally aligns with shell 5 in proximity thereto.

As seen in the drawings (Fig. 2), the configuration of the secondary disc member 12 as described, provides an annular chamber or recess 18 on its inner side within which a primary actuator disc 19 is disposed. Said primary actuator disc 19 is grooved on both its inner and outer peripheries to receive suitable seals such as "quad-ring" type seals 20 and 21 respectively, with said inner and outer peripheries of the primary disc 19 seating on shoulder 15' and a radially outwardly spaced bearing surface 17', respectively, of the secondary disc member.

Figure 3:
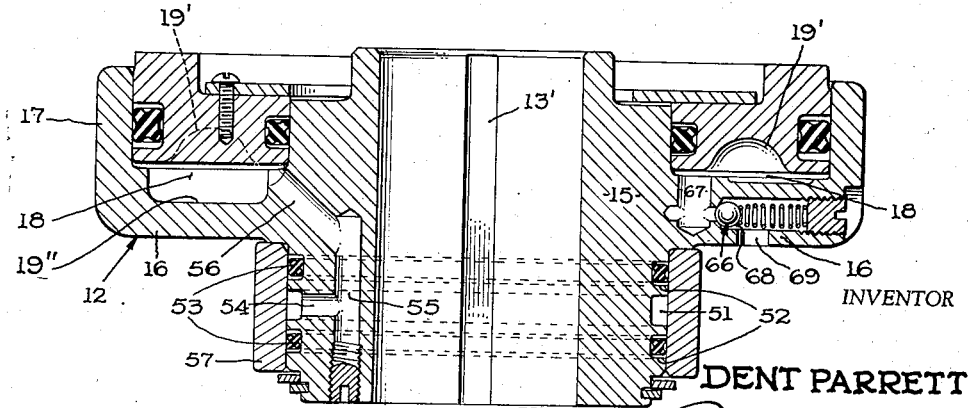
Fig. 3 is a generally horizontal cross-sectional view through the end portion of the clutch assembly which embodies the primary actuator disc and the secondary disc member, as taken on line 3—3 of Fig. 1, and showing the overload release valve as well as the passageway leading from the actuating chamber, the output shaft and other parts being omitted for clarity.

The primary actuator disc 19 is maintained in spaced relation to the radial disc or plate portion 16 of member 12 by means of a plurality of self-energizing ball and insert assemblies 22, and is disposed for both axial and slight rotative movements. The spaced relationship aforesaid, along with a plurality of dished areas 19' formed in one face of primary actuator disc 19, and with other recessed areas 19" formed in the plate or disc portion 16 of secondary disc member 12 (as best seen in Fig. 3), provide a sealed fluid actuator chamber 18. On admitting a pressure fluid medium into chamber 18, the primary disc 19 is thereby adapted to be shifted axially towards the back-up or pressure plate 11 carried on the hub 7 of the output shaft 2, and consequently shift the interleaved friction discs 8 and 9 into frictional engagement with each other and against said pressure plate 11. When the discs 8 and 9 are so engaged, power will be transmitted from shaft 1 by means of the splined hub 4, power plate 4' and outer housing shell 5 to the friction discs 8 splined thereto, and thence by frictional engagement therewith through friction discs 9 to the output shaft 2.

The hub 7 of shaft 2 is suitably apertured as at 23, at a plurality of points, preferably at three equally spaced points 120° apart, each aperture having a reduced shoulder portion 24 to receive and retain return springs 25 and associated thrust pins or dowels 26. When in assembled relation, the springs 25 normally urge dowels 26 against a thrust plate 27 which is secured to the primary actuator disc 19, as by screws 28, thereby maintaining a normally disengaged or released relationship between the primary disc and the interleaved friction disc pack.

The hub 7 of shaft 2 is suitably apertured, as at 23, at tured at 29 to receive a push rod 30. The bearing member 6, on which the splined output shaft 2 is journalled and rotatively separated from the housing and power plate assembly 3, is also apertured at 31 in corresponding alignment with aperture 29 in hub 7 of shaft 2.

Figure 4:
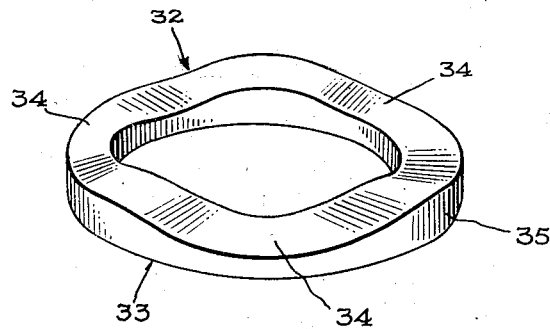
Fig. 4 is a perspective view of the operating cam member for the hydraulic pump assembly of the clutch.

An annular cam ring 32, having one flat face 33 and preferably having three continuous rise and fall sectors 34 to 120° each on its opposite face (as best seen in Fig. 4), is preferably press-fitted onto a shoulder 4" adjacent the hub section 4 and power plate 4' of the housing and power plate assembly 3, for rotation therewith. The cam 32 is further housed within the belled end of the bearing 6, and has its outer periphery 35 in bearing contact within the enlarged portion 6' of the bearing 6.

When in assembled relation, one end of push-rod 30 bears against the irregular cam face of said cam 32, while the other end bears against one end of a piston 36 which is slidably mounted in the hub 15 of secondary disc member 12.

A drilled or otherwise suitably formed piston chamber 37 provided in hub 15, within which the piston 36 reciprocates, also houses a compression spring 38 against which the piston is seated. Piston chamber 37 has a shoulder 39 through which a counterbore 40 is formed. An inlet bore or otherwise suitably formed inlet aperture 41 is provided in axial alignment with counterbore 40, being preferably drilled into the outer or opposite face of hub section 15 from that of piston chamber 37. An orifice 42 of smaller diameter than bore 40 is provided in a partition wall 43 which separates chambers 40 and 41, said wall 43 and orifice 42 forming a seat for a spring-loaded inlet ball check valve 44.

Interposed between the compression spring 38 and shoulder 39 of the piston chamber 37 is a tongued and perforated limit or stop washer 45, the details of which are best seen in Fig. 6. The perforations, as well as the slot left by the struck-out tongue 46 permit operating fluid (preferably oil) to flow freely into piston chamber 37. Washer 45 has its tongued portion 46 extending into aperture 40 through substantially the longitudinal center of a spring 44' that normally urges inlet ball check valve 44 into seated position against the orifice 42, with the end of tongue 46 serving to limit the compression of spring 44' as ball check valve 44 unseats and strikes tongue 46 during intake of hydraulic operating fluid admitted through inlet aperture 41 from a suitable source of fluid supply as hereinafter more particularly described.

Extending radially outward from piston chamber 37 is a fluid passage 47 which is alternately closed and opened by means of a spring-loaded ball check valve 48, similar to that of inlet ball check valve 44 and its associated parts, and which operatively communicates with chamber 18 through an orifice or port 49. The enlarged outer end of passage 47 is closed by an adjustable threaded plug 50 having a stop pin extended therefrom and similar in function to that of limit washer 45.

The periphery of the outer portion of hub 15 of the secondary disc member 12 is provided preferably with a plurality of spaced annular grooves, there being three grooves illustrated, the middle groove 51 being preferably of slightly greater width than the adjacent sealing grooves 52 which contain appropriate "quad-ring" seals 53. Middle groove 51 serves as an annular fluid passage and operatively communicates with the chamber 18 by means of preferably drilled or otherwise suitably formed fluid passageways 54, 55 and 56, which are best seen in Fig. 3.

Disposed about the periphery of hub 15 in encircling engagement with the sealing rings 53 in grooves 52 and about annular groove 51, is a collar 57 which is held in place against axial displacement thereon by any suitable means such as a washer 57' and a snapring 57". The collar preferably has a radially extended neck portion 58 which is provided with a fluid passage 59 aligning and communicating with the annular fluid passageway 51, said passageway 59 being enlarged at its outer extremity to receive a threaded conduit connecting fitting 60. Threaded fitting 60, in turn, is adapted to receive hydraulic fluid conduit 61 which operatively connects the clutch with an operating pressure control valve 62. Valve 62 is provided with appropriate passageways 63, 64, and 65 through which the hydraulic operating fluid will flow when circulating through the chamber 18 on its way to the oil reservoir, such as an oil sump in a transmission housing or the like in the case of an oil-immersed type clutch.

A spring-loaded pressure relief or overload valve 66 is preferably disposed within the radial disc portion 16 of the secondary disc member 12, said valve 66, as illustrated in the accompanying drawings, being located approximately 90° from valve 48, as best seen in Fig. 3.

The function of said valve 66 is to automatically release the clutch-engaging pressure fluid at any desired safe torque load on the clutch. This result is accomplished when the actuating hydraulic fluid, upon reaching a predetermined pressure, exerts a thrust against and unseats the overload valve 66, with the fluid then passing through suitably formed passageways 67, 68 and 69 and then emptying directly into the oil supply 70 (Fig. 2) of the sump or associated transmission housing T, in the case of an immersed or wet type clutch embodiment.

The operation of the friction device as described in the foregoing is as follows:

When the pressure regulating control valve 62 is open, the clutch is disengaged, and the housing and power plate assembly 3 and the middle discs 8 splined thereto rotate freely with a drive member or power input shaft 1, while the other parts of the friction device remain relatively stationary. While in this condition, push rod 30, being in contact with the rotating cam 32 and piston 36, imparts a reciprocating axial motion to said piston 36. In the immersed or wet-type clutch embodiment, the vacuum created by the piston 36 during its intake stroke, permits the hydraulic fluid to unseat the inlet ball check valve 44, and the fluid flows through inlet passage 41, past unseated ball check valve 44, through passage 40 and washer 45 into piston chamber 37. During the subsequent pressure stroke of the piston, ball check valve 44 is reseated under impetus of spring 44', and the hydraulic fluid is forced from the piston chamber 37 through passageway 47, unseating ball check valve 48, with the fluid then flowing past the unseated ball and through port 49 into the actuating pressure chamber 18. On the succeeding return or new intake stroke of the piston, the ball check valve 48 reseats itself under the impetus of its associated spring, and again, the vacuum created by the piston unseats inlet ball check valve 44, thereby continuing the inflow of oil and beginning the cycle thereof over again. Successive strokes of the piston will therefore cause the oil to be pumped into the actuating chamber 18; but, because the pressure control valve 62 is open during disengagement of the clutch, and because return springs 25, acting through thrust pins 26, bear against thrust plate 27 attached to primary actuator disc 19 and hold said primary disc in its released position, the hydraulic fluid pumped into said actuating chamber 18 merely flows on through said chamber, circulating therefrom out through passageways 56, 55, 54 and into annular groove 51, from where it flows through passageway 59 in neck portion 58 of collar 57, then through conduit 61, through the open valve 62 and back into the reservoir or oil sump in which the clutch is submerged or immersed. As long as valve 62 remains open, there is no build-up of oil pressure in the actuating chamber 18, and therefore the oil merely continues to circulate as described.

To effect engagement of the clutch, pressure control valve 62 is merely closed, thereby interrupting the flow of freely circulating oil, and because the passageways and lines are continually full of said oil, continued successive strokes of the piston 36 immediately effect a high fluid pressure build-up in the actuating chamber 18. Said pressure forces primary actuator disc 19 axially into frictional engagement with the rotating middle disc 8 at the adjacent end of the friction disc pack, said disc 8, being freely disposed for axial movement, and forcing the interleaved discs 8 and 9 into engagement with each other and with back-up or pressure plate 11. Responsive to the drag torque of the rotating middle discs 8, primary actuator disc 19 begins to rotate about its axis, and in doing so causes self-energizing ball and ramped insert assemblies 22 to function in a well-known manner to provide an exceptionally high additional frictional drive torque characteristic to a servo principle.

Also responsive to the immediate fluid pressure build-up and resultant instantaneous clutch engagement aforesaid, the pumping action of the piston 36 discontinues. This is effected as the clutch device becomes fully engaged, whereupon the output shaft 2 rotates with the drive or input shaft 1, thereby eliminating relative rotation between the cam 32 and the push rod 30.

A major advantage of this novel pumping arrangement resides in the fact that if any slippage should occur, the pumping action will automatically resume and thereby build the fluid pressure back up to operating level due to the relative rotation which effects said reciprocal pumping action.

Because of this novel construction, it becomes clearly apparent that the function of self-energization is not essential to the successful performance of the clutch.

If it is desirable to utilize an embodiment eliminating the self-energizing means, the primary actuator disc 19 can be easily adapted and restrained to move axially only in its relationship to the secondary disc member 12. The advantage of self-energization, however, remains readily apparent in that the required amount of actuating pressure of the operating fluid is reduced proportionately by the energizing effect of the ball and insert assemblies.

For the purpose of adapting the clutch of this invention to a given transmission assembly such as, for example, a Ferguson tractor, a coupling adjusting hub assembly 71 may be used. Said assembly 71 is shown in dash-dot outline in the drawings and comprises an internally splined coupling adjusting sleeve 72, flanged lock nut 73 threadedly engaged on the end of the sleeve, an internally splined thrust washer 75, and a cotter pin 74 extending through the flange of the lock nut 73 and the washer 75. This assembly merely serves to extend the shaft S of the rear pinion gear of the Ferguson transmission so that when the clutch is engaged, the shaft S is rotated. Interposed between the clutch proper and the coupling adjusting hub assembly 71 is a washer 76.

The foregoing has thus far been illustrative of an oil-immersed or so-called wet type clutch, but it is to be expressly understood that the clutch of this invention is also adaptable for practical operation as a dry type clutch.

Fig. 7 is illustrative of a typical dry clutch embodiment, wherein 77 designates the dry clutch unit or friction device as a whole. Said unit differs from the wet clutch, hereinbefore fully described, in that the output shaft 2' is of slightly longer length to accommodate the longer hub 15' of the secondary disc member 12'. Further, said hub 15' is provided with a modified intake passageway 41' that joins with an additional annular fluid passageway 51' disposed in axially spaced relationship to the fluid passageway 51. An additional annular sealing groove 52' and corresponding "quad-ring" seal 53' are also provided to insure proper sealing within the similar but wider collar 57''', said collar 57''' being retained in its proper relationship on the hub 15' by similar means as for hub 15 in the foregoing wet clutch embodiment. The collar 57'''' further differs from collar 57 of the wet clutch embodiment in that an additional or second passageway 59' is disposed in spaced relation to passageway 59, said passageways 59 and 59' connecting the dual annular passageways 51 and 51', respectively, with appropriate inlet and outlet connections in the neck portion 58'. Conduits 61' and 61 provide for the inlet and outlet, respectively, of operating pressure fluid from an appropriate oil sump or other separate reservoir 70'.

Obviously, in the dry clutch form, a new arrangement also has to be provided for a safety overload valve 66' corresponding to valve 66 of the wet clutch embodiment, in order to return the oil to the sump or separate reservoir 70' in the event the overload valve functions to relieve the pressure. Accordingly, valve 66' has been preferably incorporated within the housing body of pressure control valve 62', as clearly shown in Fig. 7. In this manner, when an excessive or predetermined fluid pressure builds up, forcing the unseating of the relief or safety valve 6', the fluid will flow through a passageway 78 and past the adjacent control valve 62' and, by means of a suitable conduit 79, into the oil reservoir 70'.

The differences between the wet and dry clutch adaptations reside only in the location of the overload valve and the separate piping of the hydraulic operating fluid to and from a reservoir. Positioning of the clutch directly in the oil within a transmission housing in the wet clutch adaptation permits said transmission housing to act as the reservoir.

Other component parts of the modified form of Fig. 7 have been designated with prime or double prime reference numerals corresponding to those used on similar parts of the first-described embodiment. Some of said parts need not be specifically referred to herein because their construction and function is basically the same as their corresponding counterparts of the first embodiment. The operation of the modified friction device also remains the same as that of the foregoing wet clutch, except for the slight detail variations and slightly different flow paths followed by the operating fluid as already described, and therefore need not be repeated herein.

Of the many advantages resulting from the novel construction described above, one of the major advantages is that the clutch will engage or disengage automatically, responsive to the substantially effortless turning of a control valve. The valve control may be further simplified to respond to the mere touch of a push button, as will be obvious.

The self-contained pumping action afforded by the invention automatically supplies the operating force which the operator heretofore was required to physically exert virtually entirely by manual effort.

Another major advantage is that the clutch of this invention automatically maintains its own hydraulic actuating or operating pressure and automatically compensates for variations in torque load.

A further important advantage resides in the completely self-adjusting feature of this clutch. It is readily seen that the lack of need for any adjustment or wear take-up apparatus further simplifies and reduces the manufacturing cost. This self-adjusting feature is especially of great importance due to the relative inaccessibility of the unit once it is assembled within a transmission.

While the specific details have been herein shown and described, the invention is not confined thereto, as various changes and alterations may be made without departing from the spirit and scope thereof as defined in the appended claims.

I claim:

1. In a torque transmitting mechanism, a fluid pressure operated friction device of the class described, comprising a pair of relatively rotatable members, relatively shiftable friction elements operatively connected with said relatively rotatable members, fluid pressure responsive actuating means for shifting said friction elements into and out of frictional engagement with each other, means for maintaining a normal running clearance between said friction elements and said actuating means, and self-contained fluid pump means comprising piston means carried by one of said relatively rotatable members and cam means carried by the other of said relatively rotatable members, said pump means being wholly disposed radially inward of said friction elements and adapted for communication with a source of operating fluid externally of the friction device at one side thereof and with the actuating means aforesaid at the other side, said pump means being operable responsive to relative rotation between said relatively rotatable members for establishing a predetermined operating fluid pressure upon the actuating means, and control means disposed remote from the friction device and operatively connected therewith for selectively controlling the pressure fluid operative upon the actuating means for initiating engagement and disengagement of said friction elements.

2. In a torque transmitting mechanism, a fluid pressure operated friction device as defined in claim 1, wherein the friction elements comprise annular friction discs, said discs being relatively shiftable both rotatively and axially with respect to each other.

3. In a torque transmitting mechanism, a fluid pressure operated friction device as defined in claim 1, wherein the pair of relatively rotatable members comprises a rotary input assembly and a rotary output assembly, respectively, said input assembly including a combined axially extended hollow bearing hub, a radially extended power plate and a cylindrical housing shell, and said output assembly including a rotary output shaft and an integral axially extended and enlarged hollow hub at one end thereof journalled on said bearing hub of the rotary input assembly.

4. In a torque transmitting mechanism, a fluid pressure operated friction device as defined in claim 1, wherein the pair of relatively rotatable members comprises a rotary input assembly and a rotary output assembly, respectively, said input assembly including a combined axially extended hollow bearing hub, a radially extended power plate and a cylindrical housing shell, and said output assembly including a rotary output shaft and an integral axially extended and enlarged hollow hub at one end thereof journalled on said bearing hub of the rotary input assembly, and wherein the said friction elements include at least one annular friction disc disposed for both rotation with and axial movements on one of said relatively rotatable members and having means at the side opposite to the actuating means to prevent axial movement thereof in one direction, and at least one annular friction disc disposed for both rotation with and axially movable relative to the other relatively rotatable member, said last mentioned friction disc being interposed between said first-mentioned friction disc and the fluid pressure responsive actuating means, and said friction discs being disposed within said housing and about said hubs.

5. In a torque transmitting mechanism, a friction device as defined in claim 1, wherein said relatively rotatable and axially shiftable friction elements include a plurality of interleaved friction discs, certain of said discs being disposed for both rotative and axially shiftable movements with one of said relatively rotatable members, and certain others of said discs being disposed for both rotative and axially shiftable movements on the other of said relatively rotatable members, said friction discs on the respective relatively rotatable members being alternately interleaved, and having means disposed at the side of said friction discs opposite to the fluid pressure-responsive actuating means for limiting axial movement of said discs away from said actuating means.

6. In a torque transmitting mechanism, a friction device as defined in claim 1, combined with a secondary disc member fixedly carried by one of said relatively rotatable members in spaced relation to said relatively shiftable friction elements and defining a chamber at one side of said friction elements, the fluid pressure-responsive actuating means aforesaid being disposed within said chamber and being interposed between said secondary disc member and the friction elements and being disposed for axial movement towards and away from said friction elements aforesaid, said actuating means having the form of an annular primary actuator disc, said primary actuator disc being provided with annular sealing means at its inner and outer peripheries for sealing the primary actuator disc relative to the chamber aforesaid.

7. In a torque transmitting mechanism, a friction device as defined in claim 1, combined with a secondary disc member fixedly and concentrically carried by one of said relatively rotatable members in spaced relation to said relatively shiftable friction elements and defining a fluid pressure chamber at one side of said friction discs, and wherein said fluid pump means comprises a piston chamber formed within the secondary disc member having its axis eccentric to but parallel with the axis of the secondary disc member and the friction device, a piston axially reciprocable in said piston chamber, said piston chamber having a fluid inlet, and also having fluid communication with the pressure chamber aforesaid, spring means disposed within said piston chamber for yieldably urging the piston in one direction, and cam means carried by the other of said relatively rotatable members for imparting operative reciprocating movement to said piston responsive to relative rotation between said relatively rotatable members aforesaid.

8. In a torque transmitting mechanism, a friction device as defined in claim 1, combined with a secondary disc member fixedly and concentrically carried by one of said relatively rotatable members in spaced relation to said relatively shiftable friction elements, and defining a fluid pressure chamber at one side of said elements, and wherein said fluid pump means comprises a piston chamber formed in the secondary disc member, a spring disposed within one end of said piston chamber, a piston axially reciprocable within said piston chamber, a push-rod reciprocably disposed within the relatively rotatable member to which the secondary disc is operatively connected and cooperatively aligned with said piston for engagement therewith, a cam member mounted for rotation with the other of said relatively rotatable members and operatively engaging the push-rod, and said fluid pump means being automatically operable by the cooperative reciprocation of said push-rod by said cam member responsive to relative rotation between said pair of relatively rotatable members.

9. In a torque transmitting mechanism, a friction device as defined in claim 1, wherein said control means includes a manually operated valve operatively connected through said pump means with the friction element-shifting actuating means at one side and communicating with the source of actuating fluid at the other side, said valve when fully opened permitting the actuating fluid to be pumped freely at a non-actuating pressure past said fluid pressure-responsive actuating means, through said control valve and back into the source of fluid, and said valve, when closed, serving to interrupt the circulating fluid and thereby effecting an instantaneous build-up of actuating fluid pressure against the friction-element actuating means for engaging said friction elements.

10. In a torque transmitting mechanism, a friction device as defined in claim 1, combined with a secondary disc member fixedly and concentrically carried by one of said relatively rotatable members in spaced relation to said relatively shiftable friction elements and defining a fluid pressure chamber at one side of said friction elements, and wherein said fluid pump means comprises a piston chamber carried by one of said relatively rotatable members, a piston axially reciprocable in said piston chamber, and means operable responsive to relative rotation between said relatively rotatable members aforesaid for imparting reciprocating movement to said piston.

11. In a torque transmitting mechanism, a fluid pressure operated friction device as defined in claim 10, wherein a fluid pressure safety release means is disposed within said secondary disc member and operatively connected with the pressure chamber at one side to limit the application of a pre-determined operating fluid pressure thereto, and adapted to be connected with a reservoir of operating fluid at the other side.

12. In a torque transmitting mechanism, a fluid pressure operated friction device of the class described, comprising a pair of relatively rotatable members, friction discs operatively connected with the relatively rotatable members aforesaid and relatively shiftable axially into and out of engagement with each other to respectively transmit and interrupt torque from one member to the other, a secondary disc member operatively connected to one of said relatively rotatable members and defining a fluid chamber at one side of the friction discs, said chamber having an inlet and an outlet, an axially shiftable and slightly rotatable pressure-responsive primary actuator disc of generally annular shape and having fluid seals carried in its inner and outer peripheries, respectively, said primary actuator disc being sealingly disposed within said chamber and axially and rotatively engageable with an adjacent friction disc to axially shift said discs into interengagement, yieldable means for operatively maintaining a normal running clearance between said friction discs and said primary actuator disc, self-energizing means disposed between said primary actuator disc and said secondary disc member for camming said primary disc and friction discs axially into greater frictional contact responsive to drag torque of the primary actuator disc, and fluid pump means comprising spring-loaded piston means carried by one of the relatively rotatable members and cam means carried by the other of said relatively rotatable members, said pump means operatively communicating with the chamber aforesaid for establishing a predetermined operating fluid pressure at the side of the primary actuator disc opposite to said friction discs, said pump means being automatically responsive to relative rotation between the relatively rotatable members aforesaid and having inlet means for admitting an actuating pressure fluid from a reservoir externally of the friction device into said pump means and having outlet means for directing said pressure fluid therefrom against said primary actuator disc for initiating frictional engagement of the friction discs, and valve control means communicating with the outlet of said fluid chamber but disposed remote from the friction device for selectively controlling the pressure established within said chamber by the pump means for engaging and disengaging said friction device.

13. In a torque transmitting mechanism, a fluid pressure operated friction device as defined in claim 12, wherein the friction device is of the fluid-immersed type, and the pump inlet is in direct communication with the fluid in which the friction device itself is immersed.

14. In a torque transmitting mechanism, a fluid pressure operated friction device as defined in claim 12, wherein the self-energizing means is disposed within the fluid chamber.

15. In a torque transmitting mechanism, a fluid pressure operated friction device as defined in claim 12, wherein the fluid chamber outlet comprises an annular concentric channel on the secondary disc member and a fluid passageway leading therefrom to said chamber, and a stationary annular cover sealing said channel and having a fluid passageway communicating with said channel and with the control means.

16. In a torque transmitting mechanism, a fluid pressure operated friction device as defined in claim 12, wherein the fluid chamber outlet comprises an annular concentric channel on the secondary disc member having a fluid passageway extending therefrom to said chamber, and a stationary annular cover sealing said channel and having a fluid passageway communicating with said channel and with the control means, and wherein the pump inlet comprises a second concentric annular channel formed on said secondary disc member and having a fluid passageway extending therefrom to said pump inlet, sealing means in said cover for the second annular channel, and a second fluid passageway in said cover communicating with said second inlet channel and adapted to be connected with a reservoir of operating fluid.

17. In a torque transmitting mechanism, a fluid pressure operated friction device as defined in claim 16, wherein a fluid pressure safety release means is disposed within the valve control means remote from the friction device but operatively connected with the pressure chamber and with the reservoir of operating fluid to limit the application of a pre-determined operating fluid pressure to the pressure chamber.

(References on following page)

References Cited in the file of this patent
UNITED STATES PATENTS

| | | |
|---|---|---|
| 635,684 | Herschmann | Oct. 24, 1899 |
| 1,780,293 | Christie | Nov. 4, 1930 |
| 2,178,050 | Peterson | Oct. 31, 1939 |
| 2,245,988 | Lambert | June 17, 1941 |
| 2,375,854 | Lambert | May 15, 1945 |
| 2,583,919 | Wilson | Jan. 29, 1952 |
| 2,719,621 | Clough | Oct. 4, 1955 |
| 2,728,429 | Kershner | Dec. 27, 1955 |

UNITED STATES PATENT OFFICE
CERTIFICATE OF CORRECTION

Patent No. 2,876,881          March 10, 1959

Dent Parrett

It is hereby certified that error appears in the printed specification of the above numbered patent requiring correction and that the said Letters Patent should read as corrected below.

Column 3, line 20, column 4, line 46, and column 6, line 50, for '"quad-ring"', each occurrence, read -- lobed --.

Signed and sealed this 23rd day of August 1960.

(SEAL)
Attest:

KARL H. AXLINE
Attesting Officer

ROBERT C. WATSON
Commissioner of Patents